(12) United States Patent
Lu et al.

(10) Patent No.: US 12,033,796 B2
(45) Date of Patent: Jul. 9, 2024

(54) DEPOSITED CARBON FILM ON ETCHED SILICON FOR ON-CHIP SUPERCAPACITOR

(71) Applicant: University of South-Eastern Norway, Kongsberg (NO)

(72) Inventors: Pai Lu, Shenyang (CN); Xuyuan Chen, Blommenholm (NO)

(73) Assignee: University of South-Eastern Norway, Kongsberg (NO)

( * ) Notice: Subject to any disclaimer, the term of this patent is extended or adjusted under 35 U.S.C. 154(b) by 0 days.

(21) Appl. No.: 16/491,239

(22) PCT Filed: Mar. 7, 2018

(86) PCT No.: PCT/EP2018/055650
§ 371 (c)(1),
(2) Date: Sep. 5, 2019

(87) PCT Pub. No.: WO2018/162580
PCT Pub. Date: Sep. 13, 2018

(65) Prior Publication Data
US 2020/0013560 A1  Jan. 9, 2020

(30) Foreign Application Priority Data

Mar. 7, 2017 (NO) .................................... 20170334
May 26, 2017 (NO) ................................... 20170865

(51) Int. Cl.
*H01G 11/26* (2013.01)
*H01G 11/36* (2013.01)
(Continued)

(52) U.S. Cl.
CPC ............. *H01G 11/26* (2013.01); *H01G 11/36* (2013.01); *H01G 11/46* (2013.01); *H01G 11/86* (2013.01)

(58) Field of Classification Search
CPC ........ H01G 11/26; H01G 11/36; H01G 11/46; H01G 11/86
See application file for complete search history.

(56) References Cited

U.S. PATENT DOCUMENTS 8,503,161 B1  8/2013  Chang et al.
9,640,332 B2  5/2017  Gardner et al.
(Continued)

FOREIGN PATENT DOCUMENTS

CN  102737859 A  10/2012
CN  105981118 A  9/2016
(Continued)

OTHER PUBLICATIONS

M. De Volder, S. Tawfick and A. J. Hart, "Controlled growth orientation of carbon nanotube pillars by catalyst patterning in microtrenches," Transducers 2009-2009 International Solid-State Sensors, Actuators and Microsystems Conference, 2009, pp. 2046-2049, doi: 10.1109/SENSOR.2009.5285636. (Year: 2009).*
(Continued)

*Primary Examiner* — David M Sinclair
(74) *Attorney, Agent, or Firm* — Bradley Arant Boult Cummings LLP

(57) ABSTRACT

An on-chip supercapacitor constituted by a silicon substrate and a porous carbon layer positioned thereon, the carbon layer including pseudocapacitive materials. The invention also relates to the method for producing the supercapacitor and the porous material.

4 Claims, 12 Drawing Sheets

(51) Int. Cl.
*H01G 11/46* (2013.01)
*H01G 11/86* (2013.01)

(56) References Cited

U.S. PATENT DOCUMENTS

| | | | |
|---|---|---|---|
| 2008/0247118 A1 | 10/2008 | Long et al. | |
| 2011/0102968 A1 | 5/2011 | Choi et al. | |
| 2011/0304964 A1 | 12/2011 | Fleischer et al. | |
| 2012/0236467 A1 | 9/2012 | Kang et al. | |
| 2013/0071751 A1 | 3/2013 | Tajima et al. | |
| 2014/0065447 A1* | 3/2014 | Liu | H01G 11/28 429/7 |
| 2014/0205902 A1 | 7/2014 | Zhao et al. | |
| 2014/0233152 A1 | 8/2014 | Gardner et al. | |
| 2014/0301020 A1 | 10/2014 | Dunn et al. | |
| 2015/0092318 A1 | 4/2015 | Zhaohui | |
| 2016/0107178 A1* | 4/2016 | Velasquez-Garcia | B05B 5/0536 239/3 |
| 2016/0148759 A1 | 5/2016 | El-Kady et al. | |
| 2016/0172123 A1 | 6/2016 | Yang et al. | |
| 2016/0314906 A1 | 10/2016 | Stucky et al. | |

FOREIGN PATENT DOCUMENTS

| | | | | |
|---|---|---|---|---|
| EP | 1511058 A1 * | 3/2005 | | C01B 32/162 |
| EP | 2764529 B1 * | 2/2016 | | H01J 1/304 |
| EP | 3067313 A1 * | 9/2016 | | H01M 4/134 |
| JP | H10-321481 A | 12/1998 | | |
| KR | 20110027965 A * | 3/2011 | | |
| WO | WO-2010/144153 A2 | 12/2010 | | |
| WO | WO-2011/143777 A1 | 11/2011 | | |
| WO | WO-2013037951 A1 * | 3/2013 | | C23C 14/046 |
| WO | WO-2015094570 A1 | 6/2015 | | |
| WO | WO-2016059296 A1 | 4/2016 | | |
| WO | WO-2018162479 A1 | 9/2018 | | |

OTHER PUBLICATIONS

Li et al., Floral-clustered few-layer graphene nanosheet array as high performance field emitter, Nanoscale, 2012, 4, 6383 (Year: 2012).*

Quan et al., Vertical few-layer graphene/metalized Si-nanocone arrays as 3D electrodes for solid-state supercapacitors with large areal capacitance and superior rate capability, Applied Surface Science, vol. 404, Feb. 1, 2017 (online availability), pp. 238-245 (Year: 2017).*

Cho et al., Three-dimensional network of coaxial carbon nanotube/manganese oxides electrode for supercapacitors, RSC Adv., Jan. 4, 2017, 7, 1282-1285 (Year: 2017).*

Niu et al., High power electrochemical capacitors based on carbon nanotube electrodes, Mar. 17, 1997, Appl. Phys. Lett. 70, 1480 (1997); https://doi.org/10.1063/1.118568 (Year: 1997).*

Fiorentino, Giuseppe, et al.; "Impact of the atomic layer deposition precursors diffusion on solid-state carbon nanotube based supercapacitors performances"; Nanotechnology 26 (2015); Jan. 20, 2015; 11 pages.

Wikimedia Foundation, Inc.; "Electrolytic capacitor"; https://en.wikipedia.org/wiki/Electrolytic_capacitor; accessed on Dec. 30, 2016; 28 pages.

Grigoras, Kestutis, et al.; "Conformal titanium nitride in a porous silicon matrix: A nanomaterial for in-chip supercapacitors"; Nano Energy, vol. 26; http://www.sciencedirect.com/science/article/pii/S2211285516300842_Nano_Energy; Aug. 2016; pp. 340-345.

Sun, Wei; "Three dimensional MEMS supercapacitors"; A Thesis Submitted to the Department of Physics at University of Oslo; Oct. 2010; 122 pages.

Jiang, Y.Q., et al.; "Planar MEMS Supercapacitor using Carbon Nanotube Forests"; IEEE 22nd International Conference on Micro Electro Mechanical Systems, Sorrento, Italy; Jan. 25-29, 2009; pp. 587-590.

"Satte verdensrekord på HiVe"; http://byavisa.sandefjord.no/nor/Naering/Aktuelt/Satte-verdensrekord-p . . . ; Mar. 9, 2011; 2 pages.

Zheng, Wen, et al.; "High-performance solid-state on-chip supercapacitors based on Si nanowires coated with ruthenium oxide via atomic layer deposition"; Journal of Power Sources 341 (2017); Dec. 2, 2016; pp. 1-10.

Lu, Pai; et al.; "Nano fabricated silicon nanorod array with titanium nitride coating for on-chip supercapacitors"; Electrochemistry Communications 70 (2016); Jul. 4, 2016; pp. 51-55.

Müller, L., et al.; "Infrared emitting nanostructures for highly efficient microhotplates"; Journal of Micromechanics and Microengineering 24 (2014); Feb. 28, 2014; 9 pages.

Frias Rebelo, Artur, International Search Report for PCT/EP2018/055650; as mailed Nov. 7, 2018; 6 pages.

Ghosh, R., et al.; "Silicon nanowire heterostructures for advanced energy and environmental applications: a review"; Nanotechnology, vol. 28, No. 1; Nov. 28, 2016; 26 pages.

Conway, Brian Evans; *Electrochemical Supercapacitors: Scientific Fundamentals and Technological Applications*; Springer; 1999; pp. 1-9.

Lang, Xingyou, et al.; "Nanoporous metal/oxide hybrid electrodes for electrochemical supercapacitors"; Nature Nanotechnology, vol. 6; Feb. 20, 2011; pp. 232-236.

Bae, Joonho, et al.; "Fiber Supercapacitors Made of Nanowire-Fiber Hybrid Structures for Wearable/Flexible Energy Storage"; Angew. Chem. Int. Ed., vol. 50; Jan. 14, 2011; pp. 1683-1687.

* cited by examiner

DEPOSITED CARBON FILM ON ETCHED SILICON FOR ON-CHIP SUPERCAPACITOR

TECHNICAL FIELD

The present invention relates to so-called supercapacitors comprising electrodes of a carbon film deposited on etched silicon wafer. Such supercapacitors have been shown to exhibit impressive properties that may be exploited in various applications. In particular, the present invention relates to an on-chip supercapacitor that is produced with a method, which is compatible with the fabrication methods for on-chip electric circuitry.

Supercapacitors are high-capacity capacitors with capacitance values much higher than other capacitors (dielectric capacitors, electrolytic capacitors). In this invention, the involved supercapacitor is an electric double layer capacitor (EDLC), which is typically based on the electrostatic storage of the electrical energy achieved by separation of charge in a Helmholtz double layer at the interface between the surface of a conductor electrode and an electrolytic solution electrolyte (Reference: Conway, Brian Evans (1999), Electrochemical Supercapacitors: Scientific Fundamentals and Technological Applications (in German), Berlin, Germany: Springer, pp. 1-8, ISBN0306457369)

BACKGROUND ART

On-chip supercapacitor refers to the supercapacitor built up on the chip, which could be used as the power source and, further integrated with the silicon based electronic devices (cordless sensors and transducers, as well as data storage units). Improved energy density is highly anticipated in the community of on-chip supercapacitors. An object of the present invention may be to provide a high energy density supercapacitor device on-chip. An example of an on-chip supercapacitor is shown in W. ZHENG et al., "High-performance solid-state on-chip supercapacitors based on Si nanowires coated with ruthenium oxide via atomic layer deposition", Journal of Power Sources, vol 341, 15 Feb. 2017, Pages 1-10.

Another object of the present invention may be to provide a method of producing such a supercapacitor.

Supercapacitors are often referred to as electrochemical capacitors, which is typically characterized by the electric double layer capacitor, which is typically based on the electrostatic storage of the electrical energy achieved by separation of charge in a Helmholtz double layer at the interface between the surface of a conductor electrode and an electrolytic solution electrolyte such as electrode materials (pseudocapacitive materials) with electrolyte ions.

SUMMARY OF THE INVENTION

The present invention is based on a carbon film deposited on a silicon substrate. As used with a supercapacitor according to the invention, the carbon film functions as the electrochemical active material for energy storage. It is, however, a challenge to obtain a sufficiently dens and thick film of carbon on a silicon surface to provide a sufficiently high capacitance. It is therefore an object of the present invention to provide a silicon based super capacitor using a high-density carbon layer. This is obtained as characterized in the accompanying claims.

According to one aspect of the invention that has been discussed in patent applications NO20170865 and NO20170334 from which the present application claims priority and which are incorporated here by way of reference, the silicon has elongated/one-dimensional nanostructure, vertically arranged on the substrate. On the etched silicon, transition metal particles are deposited. The transition metal particles promote and enable the formation of carbon. If no metal particles are deposited on the silicon, there would be not any carbon material formed on the etched silicon. Thus the metal particles act as a catalyst for the growth of carbon materials on the etched silicon substrate which in this way produces a high density carbon film with a high mass loading (typically, in the range of 3 mg/cm$^2$, 0.6 g/cm$^3$, 50 □m) proving a high capacitance material. As an example this may be obtained as the carbon atoms from a decomposition of $C_2H_2$ can be first dissolved in the transition metal particles in a CVD process. When the saturation is reached, the carbon material will form. This process is a typical catalytic growth process for carbon material via CVD, and well known by the skilled person.

In the preferred embodiment of the invention the invention, the carbon film is a porous carbon film deposited on a silicon substrate, where the specific porous carbon film provides a area of 200-1000 m$^2$ g$^{-1}$, with the typical pore range of 2-100 nm. The pores in the nanoscale range are created by aggregation of carbon nanomaterials, in the typical form of fullerene-like carbon nanoparticles and multi-walled carbon nanotubes.

According to the invention, the pseudocapacitive materials refer to the materials that can be used as the electrode materials for pseudo capacitors, which store the electrical energy relying on reversible chemical reaction.

According to one embodiment of the method for producing the unit, e-beam evaporation process is used to deposit transition metal particles on the etched silicon. The catalyzed growth of carbon material on transition metal particles is performed by a chemical vapor deposition process. "catalyzed growth" herein means the transition metal particles facilitate the decomposition of carbon source gas to form elemental carbon. The carbon source gas is the precursor used in the chemical vapor deposition process to produce carbon, it could be alkane, alkene, alkyne gases and not limited by such gases.

According to a first aspect of the present invention, there is provided an on-chip supercapacitor having an electrode comprising one-dimensional silicon (Si) nanostructures that are coated by a carbon film.

With the term "on-chip", as in "on-chip supercapacitors", it is herein meant capacitors that are produced on silicon chips, produced from silicon wafers, either as independent units or as capacitors in Si-based integrated circuits.

With the term one-dimensional silicon nanostructure, is herein meant a nanostructure of silicon having an elongated, thin shape, such as a hair (by means of shape, not by means of dimension), with an aspect ratio above 5. Such silicon structures are often referred to in the art as silicon nanorods or nanowires.

In some embodiments, the one-dimensional silicon nanostructures can extend upright from a silicon base in a pre-determined pattern. That is, the nanostructures, often referred to as nanorods when arranged according to this embodiment, can be produced in predetermined positions on the silicon substrate. This may be done by a top-down or bottom-up method. Typically, the pattern will exhibit a systematic layout of the nanostructures, such as parallel rows. Such rows are often referred to as nanorod arrays. Moreover, the predetermined pattern is such that the nanorods are arranged with a mutual distance between them, so that they are substantially not in contact with each other. Such a distance is appropriate for inward deep deposition of transition metal particles.

In some embodiments, the pseudocapacitive materials include transition metal oxides (typically, manganese oxide, nickel oxide, cobalt oxide etc.) and conductive polymers (typically, polyaniline, polypyrrole, etc.)

In some embodiments involving a porous carbon film, the deposition of the pseudocapacitive material layers into a porous carbon is performed by a chemical bath deposition process. In this process, the porous carbon film is floated on or submerged in the plating solution.

In some embodiments, the plating solution includes precursors dissolved in solvents (water, organic solvents etc.), which can chemically decompose, and further to form pseudocapacitive materials onto the pore walls of the porous carbon film.

In some embodiments, the thickness of the pseudocapacitive material layers deposited into the porous carbon film is ranging from 2 nm to 100 nm.

With the term "on-chip", as in "on-chip supercapacitors", it is herein meant capacitors that are produced on silicon chips, produced from silicon wafers, either as independent units or as capacitors in Si-based integrated circuits According to a second aspect of the present invention, there is provided a method of providing an on-chip supercapacitor electrode on a silicon substrate. The method comprises the following steps:
a) providing a plurality of one-dimensional silicon nanostructures on a substrate;
b) Deposit nickel nanoparticles on the etched silicon;
c) Deposition of carbon film catalyzed by transition metal particles, which function as catalysts.

In some embodiments of method according to the second aspect of the invention, step c) may comprise a chemical vapor deposition process.

In some embodiments, step c) of the method can include the following step:
i) In a tube furnace, exposing the etched silicon substrate (deposited with transition metal particles) to a floating mixed gas, which include Ar, $H_2$, and $C_2H_2$ at 600-1000° C.

Step i) may advantageously include performing step c) for a reaction period of between 4 minutes and 1 hour.

In the embodiment involving the porous film the invention relates to a method of providing layers of pseudocapacitive materials into a specific porous carbon film. The method preferably comprises the following steps:
(1) Preparation of the plating solution for deposition of the pseudocapacitive electrode materials.
(2) The specific compact yet porous carbon film is floated on or submerged in the plating solution. The deposition process is lasted from 0 to 24 hours, and kept at room temperature or relatively high temperature (20-90° C.).

BRIEF DESCRIPTION OF DRAWINGS

While a general discussion of the present invention has been given above, some more detailed examples of embodiment are given in the following with reference to the drawings, illustrating the invention by way of examples, in which.

DETAILED DESCRIPTION OF THE INVENTION

Figure 1:
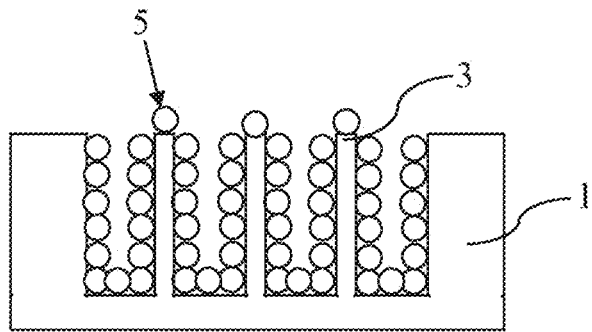
FIG. 1 depicts a principle perspective view of silicon nanorods produced in a silicon wafer, with deposited transition metal particles according to the known art.
Figure 2:
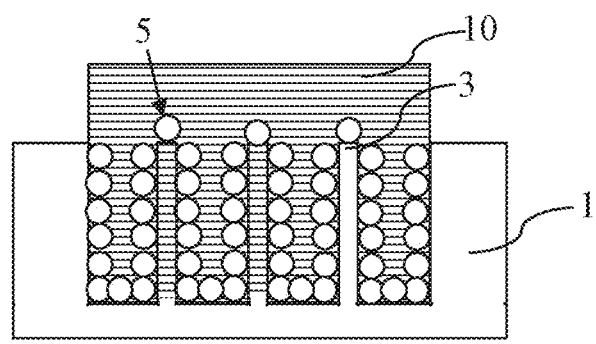
FIG. 2 depicts etched silicon nanorods coated with a carbon film.

FIG. 1 illustrates silicon nanorods 3 deposited with transition metal particles 5, comprising silicon nanorods 3 extending upwards from a silicon base 1, and the deposited particles 5 on the nanorods 3. The silicon nanorods 3 can typically be produced with deep reactive ion etching (DRIE) in a silicon wafer. Typical heights of the nanorods 3 can be between 5 and 20 µm. In some embodiments, typical height is about 15 µm. Typical widths or diameters of the silicon nanorods 3 can be between 0.2 to 2.0 µm, more typically about 0.5 µm. Typically the deposited metal is nickel, and the size of nickel particles 5 can be between 5 nm to 50 nm. In some embodiments, typical width or diameter of the nickel particles 5 is about 20 nm. FIG. 2 depicts a carbon film 10 deposited on nickel particles 5 coated etched silicon 3. Typically, the thickness of the carbon film 10 can be between 5 to 100 µm. In some embodiments, typical thickness is about 50 µm.

As the skilled person will appreciate, the illustrations of FIG. 1 and FIG. 2 are principle drawings only, in which layer thickness, aspect ratios, shape etc. not necessarily are correct.

FIG. 3a to FIG. 3d principally depicts the steps of producing silicon nanorods 3 coated with nickel particles 5 and a carbon film 10, according to an embodiment of the present invention. All four figures are cross section side views through an upper part of a silicon wafer.

Figure 3A:
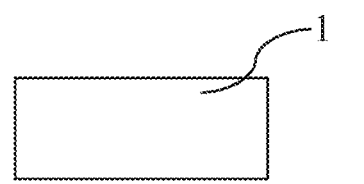
FIG. 3a to FIG. 3d principally illustrate the production of a deposited carbon film on etched silicon substrate used in a supercapacitor according to the present invention.
Figure 3B:
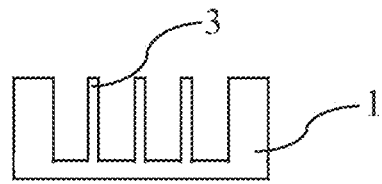

FIG. 3a principally depicts a part of a silicon wafer 1, which has not yet been processed. With a DRIE process (deep reactive ion etching), silicon material is removed from the wafer, leaving a plurality of silicon nanorods 3 extending in an upright orientation, from the silicon base 1, as shown in FIG. 3b. As the skilled person will appreciate, the shape of the nanorods 3 in a more realistic embodiment may have a larger aspect ratio (length/diameter) than what is shown in FIG. 3b.

Figure 3C:
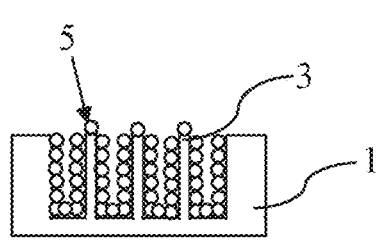
Figure 3D:
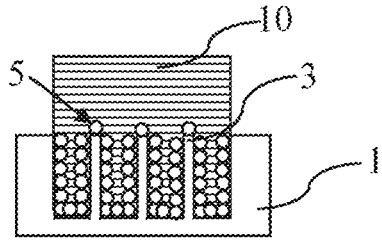

FIG. 3c depicts the nanorods 3 after having been coated with the nickel particles 5. Finally, FIG. 3d depicts the etched nanorods having been coated by the carbon film 10. As can be seen from the drawings the carbon film 10 will preferably cover the tops of the nanorods 3.

Fabrication of Nickel Particles Coated Etched Silicon Nanorods

A cyclic deep reactive ion etching process can be used to etch the silicon substrate. Such a process is known to the person skilled in the art, and will not be discussed in detail herein. While the DRIE process is a so-called top-down process, where silicon material is removed to obtain remaining nanorods, one may also employ a bottom-up process to produce the elongated nanostructures. Details of this process, for the used with an embodiment of the present invention can be found in the following two papers:

Lu (P. Lu, P. Ohlckers, L. Mueller, S. Leopold, M. Hoffmann, K. Grigoras, J. Ahopelto, M. Prunnila, X. Y. Chen), "Nano fabricated silicon nanorod array with titanium nitride coating for on-chip supercapacitors" Electrochem. Commun. 70 (2016) 51-55; and Mueller (L. Mueller, I. Kapplinger, S. Biermann, W. Brode, M. Hoffmann, J.), "Infrared emitting nanostructures for highly efficient microhotplates", Micromech. Microeng. 24 (2014) 035014.

After producing the silicon nanorods, they are deposited and coated with nickel particles. This can be performed with an e-beam evaporation process. The working principle of this process is known to the skilled person.

Specifically, the etched silicon substrate sample is placed in a vacuum chamber for deposition with a base pressure of $5 \times 10^{-7}$ to $1 \times 10^{-6}$ Torr, The nickel source is evaporated by applying constant emission current of 60-80 mA for evaporation time of 20 minutes to 1 hour. The deposition is carried out at a working pressure of $1 \times 10^{-6}$ to $5 \times 10^{-6}$ Torr at room temperature.

Deposition of Carbon Film on Etched Silicon

In order to produce a supercapacitor, carbon film as the electrode active material is deposited on the etched silicon.

In a typical embodiment, the deposition of carbon film is performed with a chemical vapor deposition process. The working principle of this process is known to the skilled person.

Specifically, the deposition of the carbon film with a thickness of 30-50 μm (packing density: 3-5 mg cm$^{-2}$) is in a typical process performed in a furnace with quartz tube. The etched silicon samples are placed under vacuum in the quartz tube, and when 5-10 mTorr was reached, 400-800 sccm of Ar and 50-100 sccm H$_2$ was introduced to maintain atmospheric pressure in the quartz tube. The furnace was heated up to 600-1000° C. at a rate of 10° C. min. When the temperature reached 600-1000° C., 4-8 sccm $C_2H_2$ was added to the gas mixture and held at 600-1000° C. for 10 minutes to 20 minutes. The carbon film may for example be composed of carbon nanotube units, in which the nickel particles on the etched silicon can promote the formation and further dense stacking of the carbon nanotubes. The dense packing of carbon nanotubes results in the formation of this dense film. As an alternative the carbon films is a porous carbon film, with a specific surface of 300 to 1000 m$^2$/g. During this deposition process, the following reaction takes place, resulting in the formation of carbon film on the etched silicon.

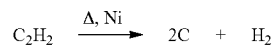

This deposition method, for obtaining a high-density carbon film on the silicon nanorods is suitable for implementation in a silicon integrated circuit production line. The process can then be performed as three-step batch process:
(1) Silicon wafers can be etched on a silicon etching production line;
(2) Nickel particles deposition can be performed on an e-beam evaporation production line;
(3) Carbon film deposition can be performed on a chemical vapor deposition production line.

Supercapacitor Performance

Figure 4:
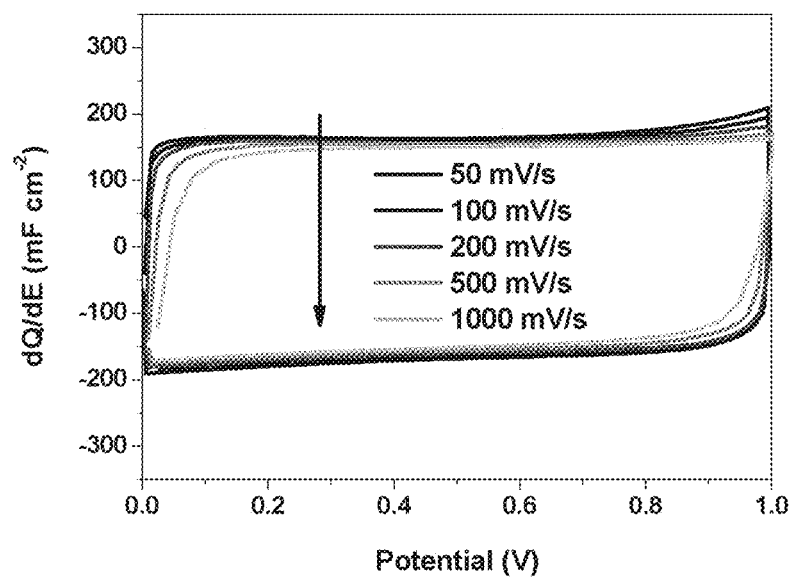
FIG. 4 is a capacitance-voltage diagram for a supercapacitor according to prior art and a supercapacitor according to the invention.

FIG. 4 depicts the measured capacitance-voltage diagram for a supercapacitor according to prior art and a supercapacitor according to the invention. The rectangular shape of the plotted curve presents an ideal capacitor performance.

Figure 5:
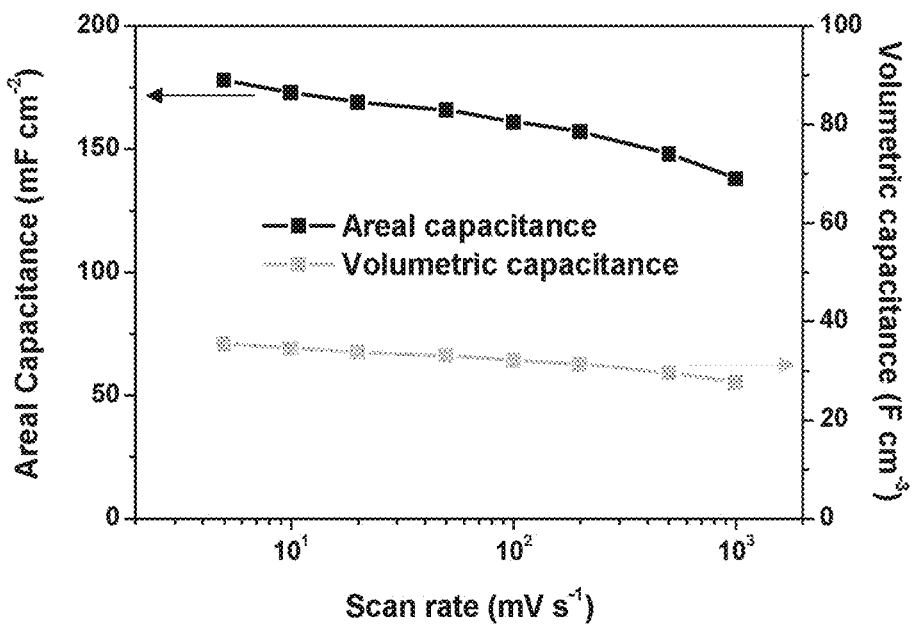
FIG. 5 depicts the calculated capacitance normalized to the area and volume of the carbon film for a supercapacitor according to prior art and a supercapacitor according to the invention.

FIG. 5 depicts the calculated capacitance normalized to the area and volume of a carbon film electrode for a supercapacitor according to prior art and a supercapacitor according to the invention; The area capacitance can reach 178 mF cm$^{-2}$, and the volumetric capacitance can reach 35.6 F cm$^{-3}$.

Figure 6:
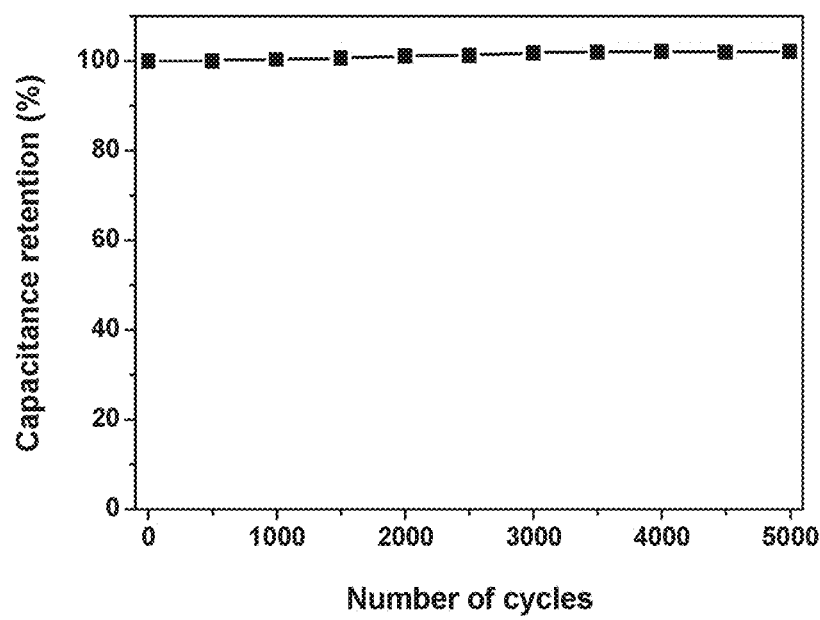
FIG. 6 depicts capacitance retention for the on-chip supercapacitors, according to prior art and a supercapacitor according to the invention.

FIG. 6 depicts capacitance retention for the on-chip supercapacitors, according to prior art and a supercapacitor according to the invention. The supercapacitor can be used by 5000 charge/discharge cycles without any decay of the capacitance.

Figure 7A:
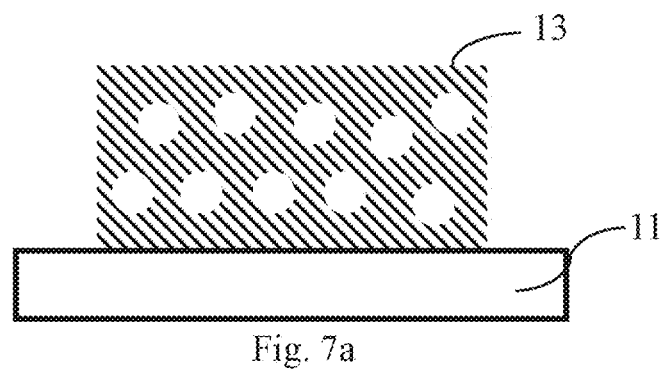
FIG. 7a and FIG. 7b depicts the deposition of pseudocapacitive materials into the specific porous carbon film.
Figure 7B:
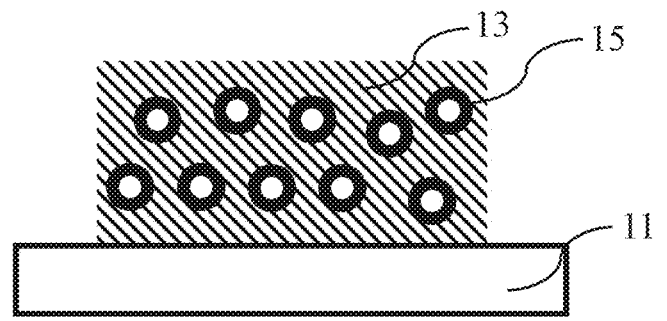

FIG. 7a,b illustrates the preferred embodiment of the invention including a specific porous carbon film 13 on a silicon chip 11, deposited with layers of pseudocapacitive materials 15 as discussed above. The typical thickness of the porous carbon film is maintained after the deposition of pseudocapacitive material, in the typical range of 5 μm to 100 μm. The specific porous carbon film provides a surface area of 200-1000 m$^2$ g$^{-1}$, with the typical pore range of 2-100 nm. The thickness of the deposited pseudocapacitive material is ranging from 2 to 100 nm.

As the skilled person will appreciate, the illustrations of FIGS. 7a and b are principle drawings only, in which layer thickness, aspect ratios, shape etc. not necessarily are correct.

Figure 8A:
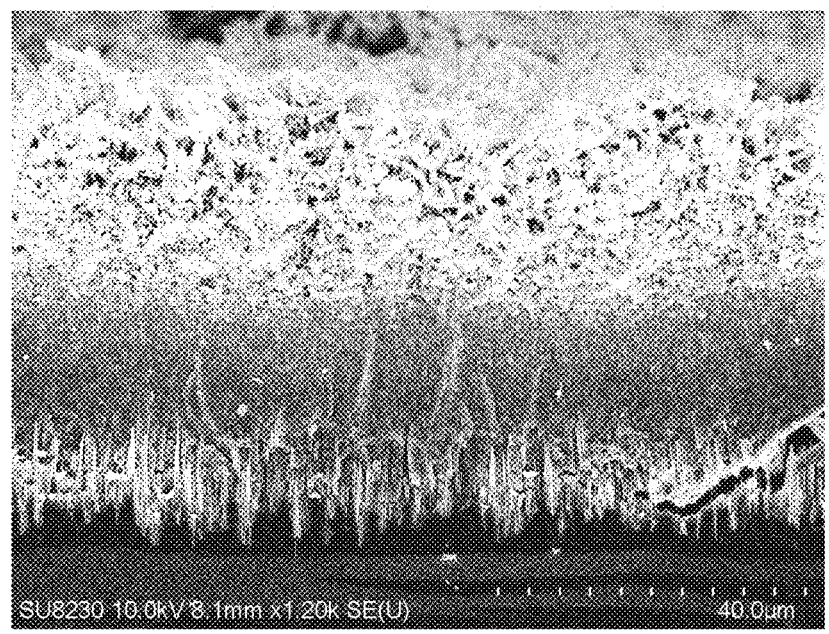
FIG. 8a shows the cross section of the porous carbon film with deposited pseudocapacitive material (manganese oxide in this case), with the scanning electron microscopy characterization technique.
Figure 8B:
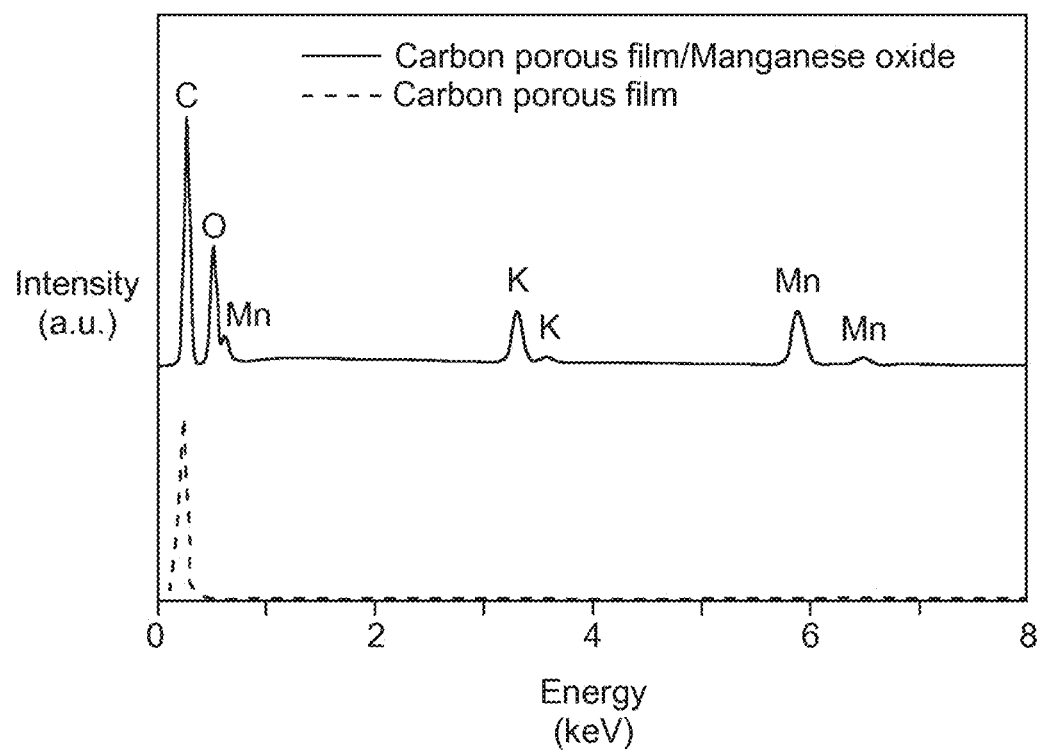
FIG. 8b shows the element components of the porous carbon film without and with the deposited pseudocapacitive material (manganese oxide in this case), with the energy dispersive X-ray spectroscopy characterization technique.

FIG. 8a shows the scanning electron microscopy image of the cross section of the porous carbon film with deposited pseudocapacitive material (manganese oxide in this case), with a typical average thickness of 50 μm. FIG. 8b shows the element components of the porous carbon film without and with the deposited pseudocapacitive material (manganese oxide in this case), with the energy dispersive X-ray spectroscopy characterization technique, the detected manganese and oxygen elements besides the original carbon element confirm the formation of manganese oxide into the porous carbon film.

In order to produce a supercapacitor, pseudocapacitive material layers as the electrode active materials are deposited into the porous carbon film.

In a typical embodiment, the deposition of pseudocapacitive materials is performed with a chemical bath deposition process. The working principle of this process is known to the skilled person.

In the first example, manganese oxide is chosen as one typical sample to demonstrate the process. The deposited pseudocapacitive material is not limited to manganese oxide, it can be other transition metal oxides (nickel oxide, cobalt oxide etc.), or conductive polymers (polyaniline, polypyrrole etc.). Specifically, the specific carbon film on a chip with a thickness of 30-50 μm (packing density: 3-5 mg cm$^{-2}$) is floated on or submerged in a plating solution (0.01-0.1 M KMnO$_4$), held at 20-90° C. for 10 minutes to 24 hours.

During this deposition process, the following reaction takes place, resulting in the formation of manganese oxide into the porous carbon.

$$2KMnO_4 + C \rightarrow K_2MnO_4 + MnO_2 + CO_2$$

Figure 9A:
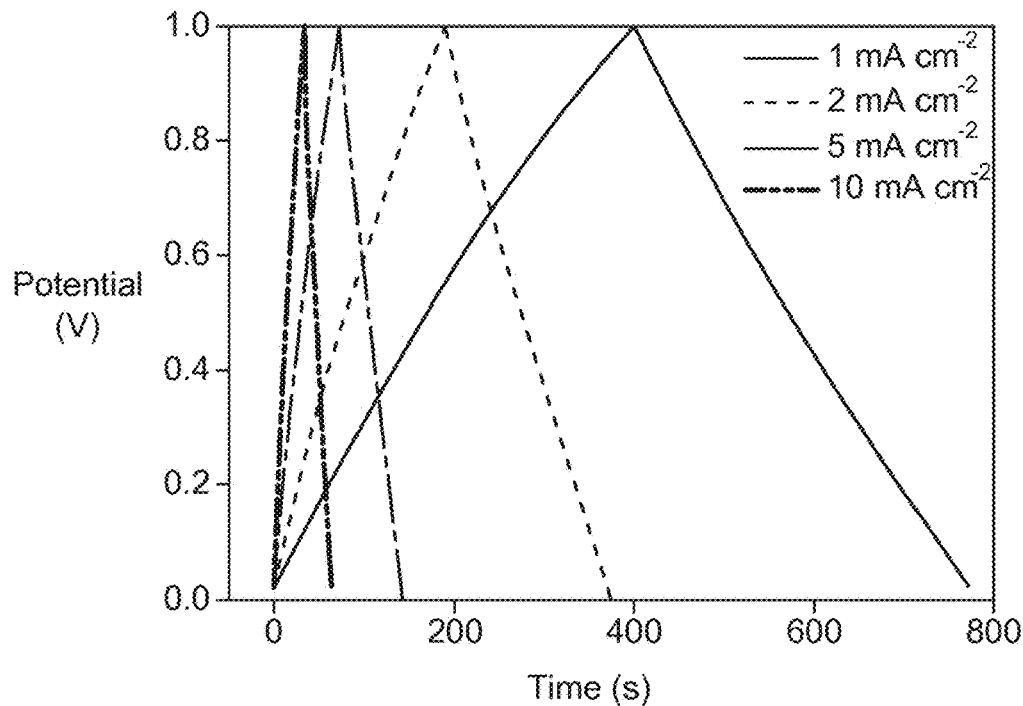
FIG. 9a shows the charging/discharging measurement results.
Figure 9B:
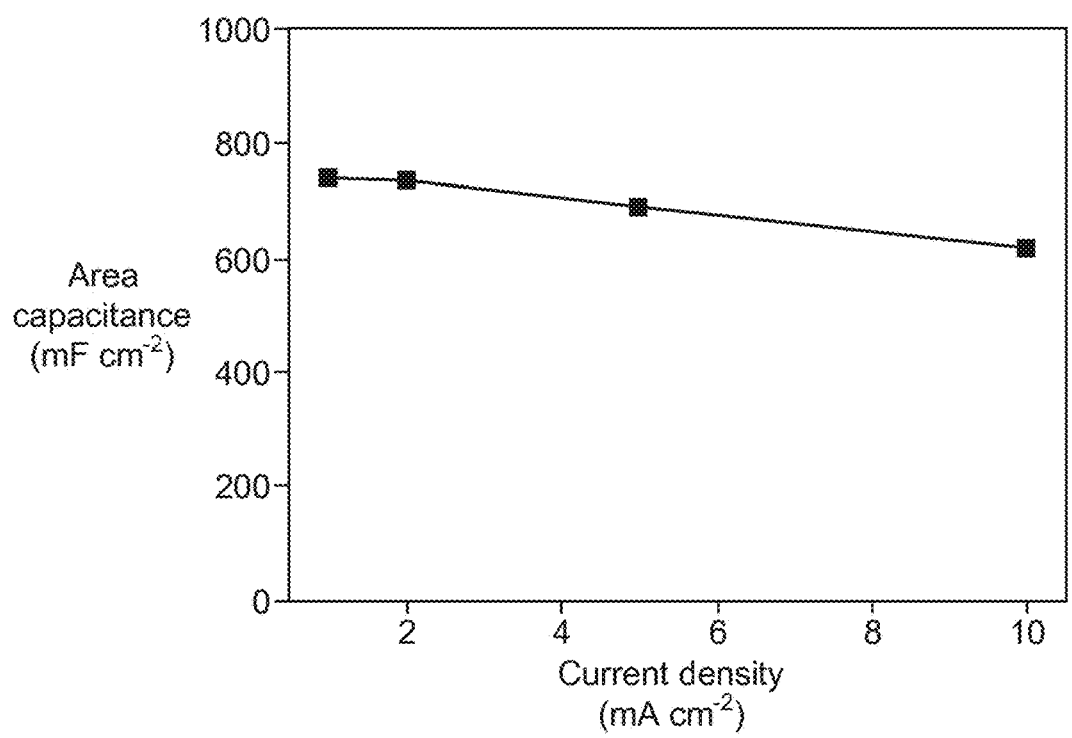
FIG. 9b shows the calculated capacitance normalized to the area, for a supercapacitor according to prior art and a supercapacitor according to the invention (manganese oxide deposited into the porous carbon film, for this case).
Figure 10:
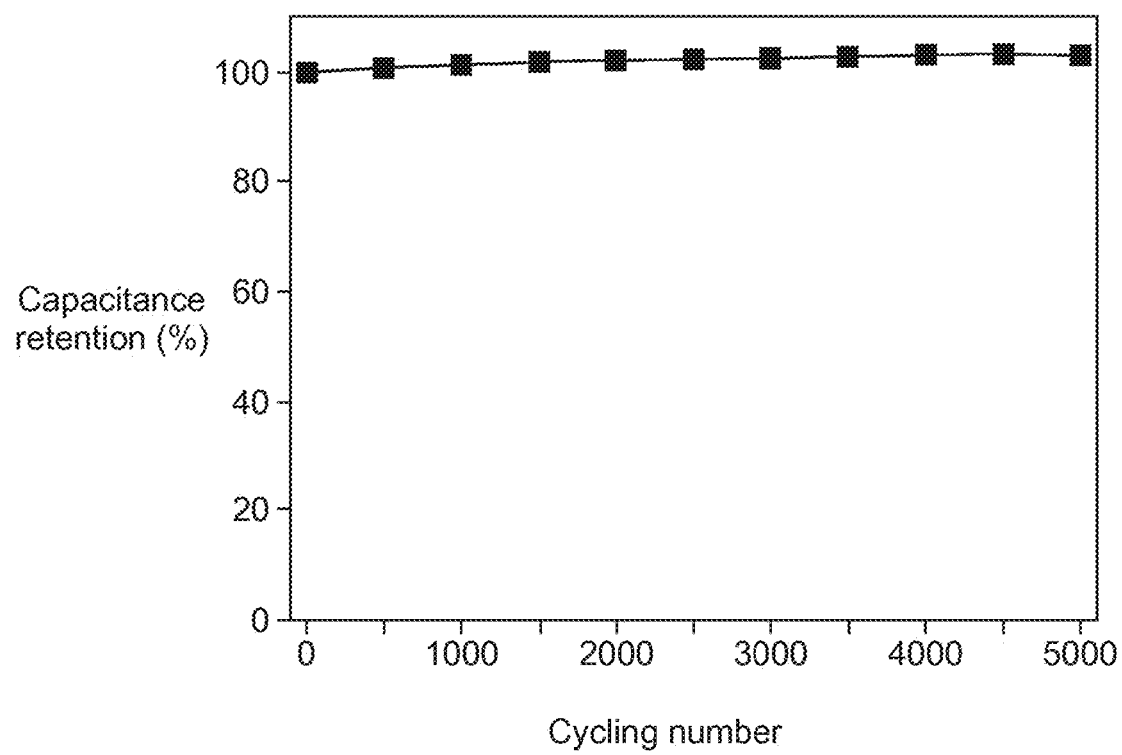
FIG. 10 depicts capacitance retention for the on-chip supercapacitors, according to prior art and a supercapacitor according to the invention (manganese oxide deposited into the porous carbon film, for this case).

FIG. 9a depicts the charging/discharging measurement results for a supercapacitor according to prior art and a supercapacitor according to the invention. 1 M Na$_2$SO$_4$ is used as the electrolyte. The symmetric triangular shape of the plotted curve presents an ideal capacitor performance. FIG. 9b shows the calculated capacitance according to the charging/discharging plots shown in FIG. 9a. Normalized to the area of one electrode for a supercapacitor according to prior art and a supercapacitor according to the invention, the area capacitance can reach 741.6 mF cm$^{-2}$ at a charging/discharging rate of 1 mA cm$^{-2}$, and 641.0 mF cm$^{-2}$ at a charging/discharging rate of 10 mA cm$^{-2}$.

FIG. 4 depicts capacitance retention for the on-chip supercapacitors, according to prior art and a supercapacitor according to the invention. The supercapacitor can be used by 5000 charge/discharge cycles without any decay of the capacitance.

In the second example, nickel hydroxide is chosen as one typical sample to demonstrate the process. Specifically, the specific carbon film on a chip with a thickness of 30-50 μm (packing density: 3-5 mg cm$^{-2}$) is floated on or submerged in a plating solution (0.01-0.1 M Ni(NO$_3$)$_2$, 0.02-0.2 hexamethylenetetramine), held at 60-90° C. for 10 minutes to 4 hours. This process results in the formation of nickel hydroxide into the porous carbon film.

In the third example, a typical conductive polymer (polyaniline) is chosen to demonstrate the process. Specifically, the specific carbon film on a chip with a thickness of 30-50 μm (packing density: 3-5 mg cm$^{-2}$) is floated on or submerged in a plating solution (0.01-0.1 M aniline, 0.1-1 M H$_2$SO$_4$), held at 20-40° C. for 10 minutes to 2 hours. This process results in the formation of nickel hydroxide into the porous carbon film.

Figure 11:
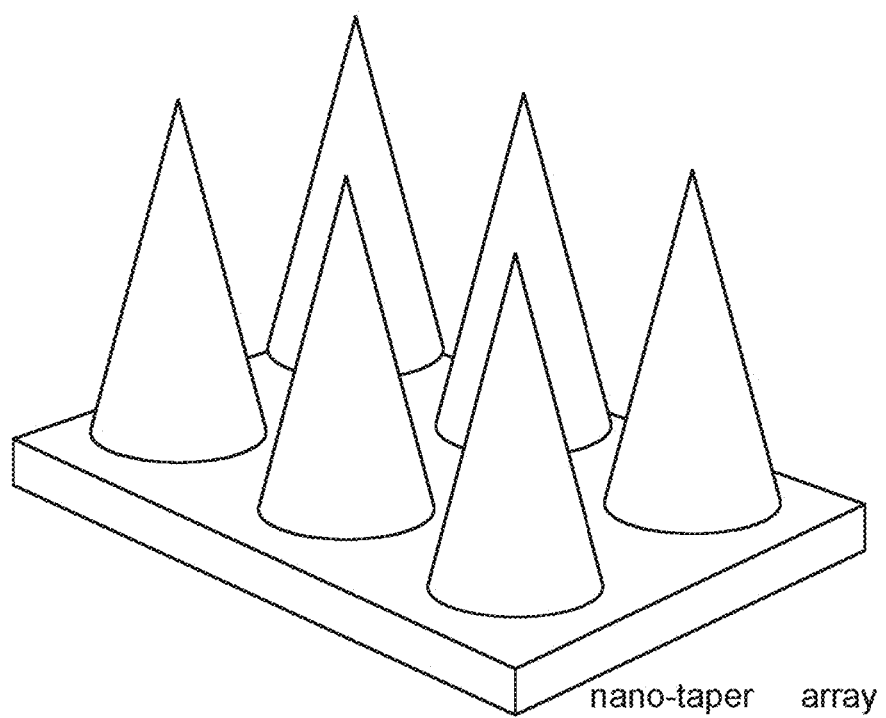
FIG. 11 illustrates the silicon substrate having elongated/one-dimensional nanostructure, vertically arranged on the substrate appeared as the nano-taper array shape.
Figure 12A:
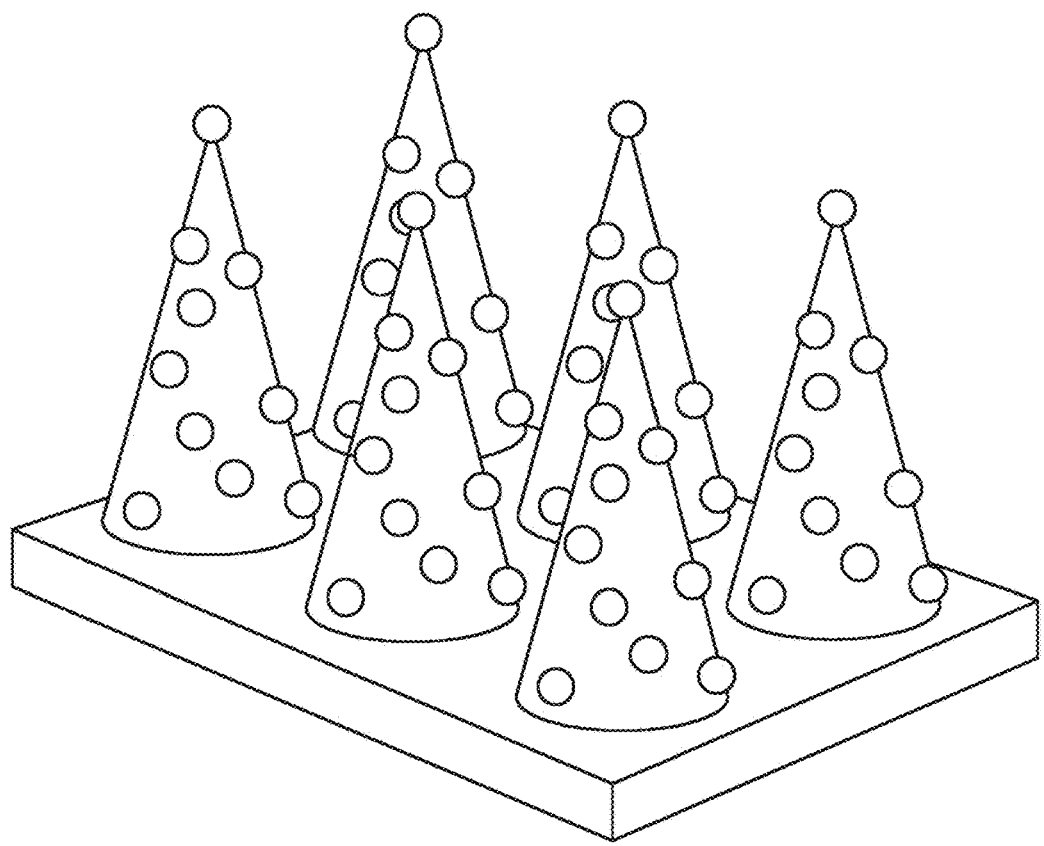
FIG. 12 illustrates the tapered array 12a with catalyst metal particles and the surface projection of substrate 12b.
Figure 12B:
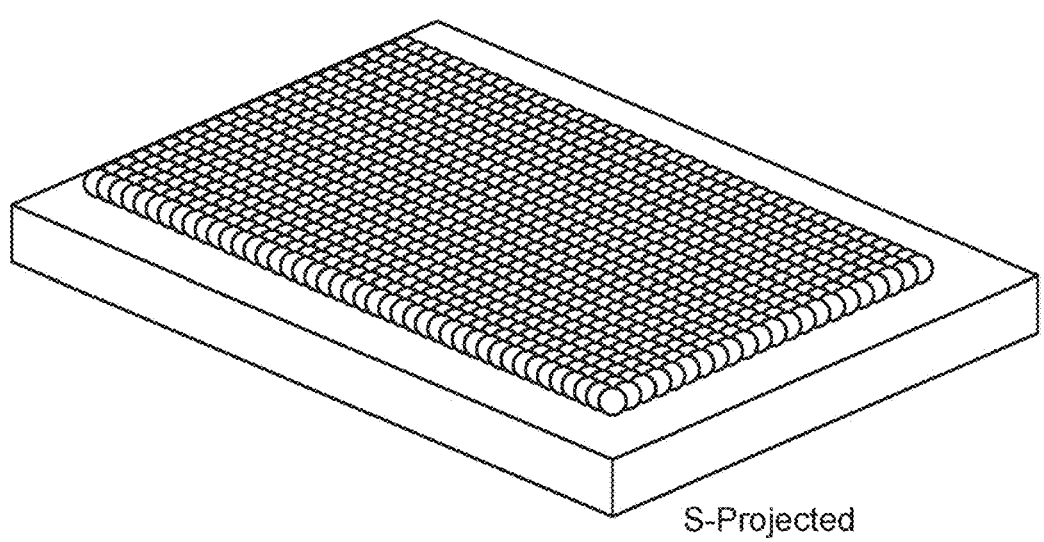

FIGS. 11-14 illustrates how a porous carbon layer for the application of the present invention may be produced, e.g. starting with a nano-tapered array as in FIG. 11. As shown in FIG. 12a metal particles, e.g. Nickel or other transition metals, is deposited on the tapered substrate. FIG. 12b shows a surface projection of the substrate illustrating the obtained density relative to the plane.

Figure 13:
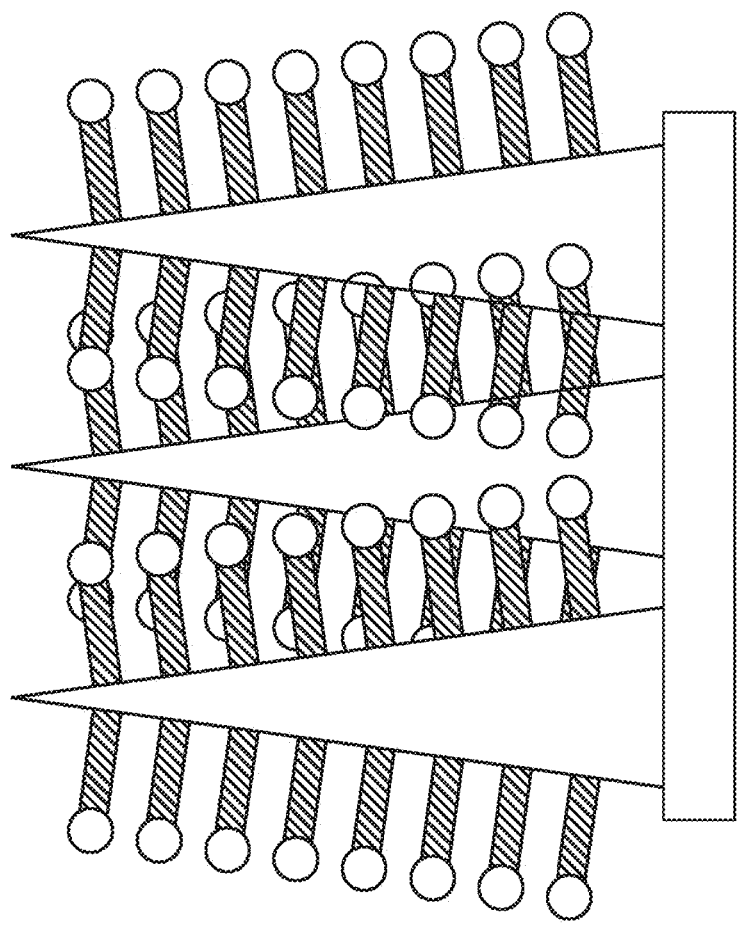
FIG. 13 illustrates the growth on from the tapered substrate with metal particles.
Figure 14:
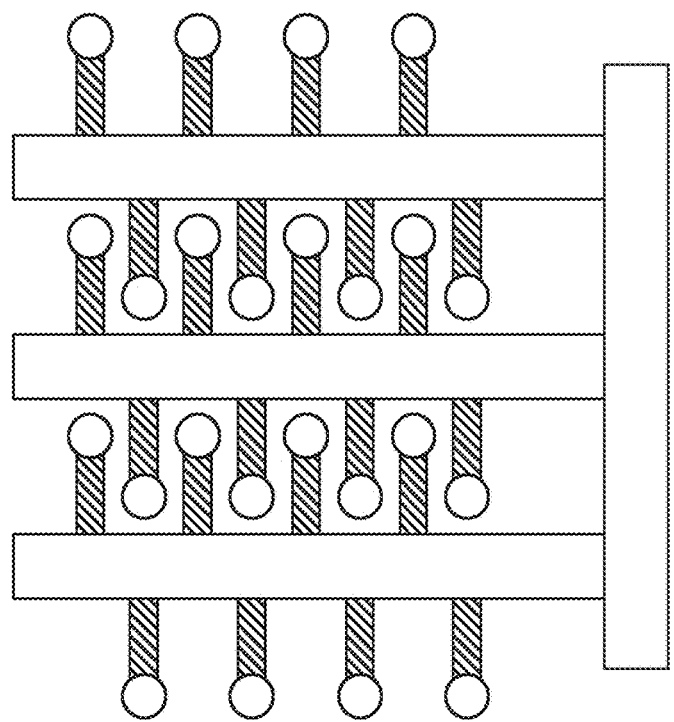
FIG. 14 illustrates a similar growth pattern from a plane surface and a set of nano-rods.
Figure 14:
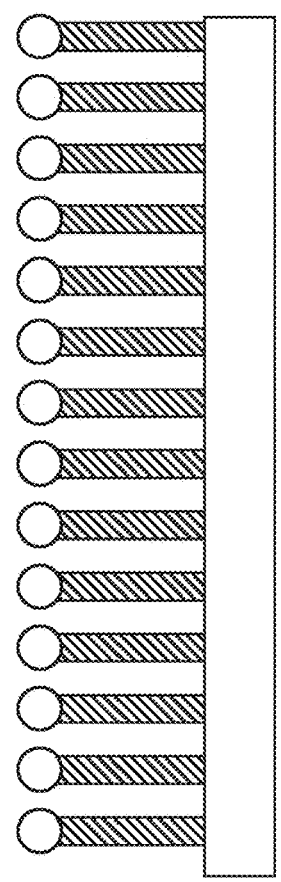
Figure 15:
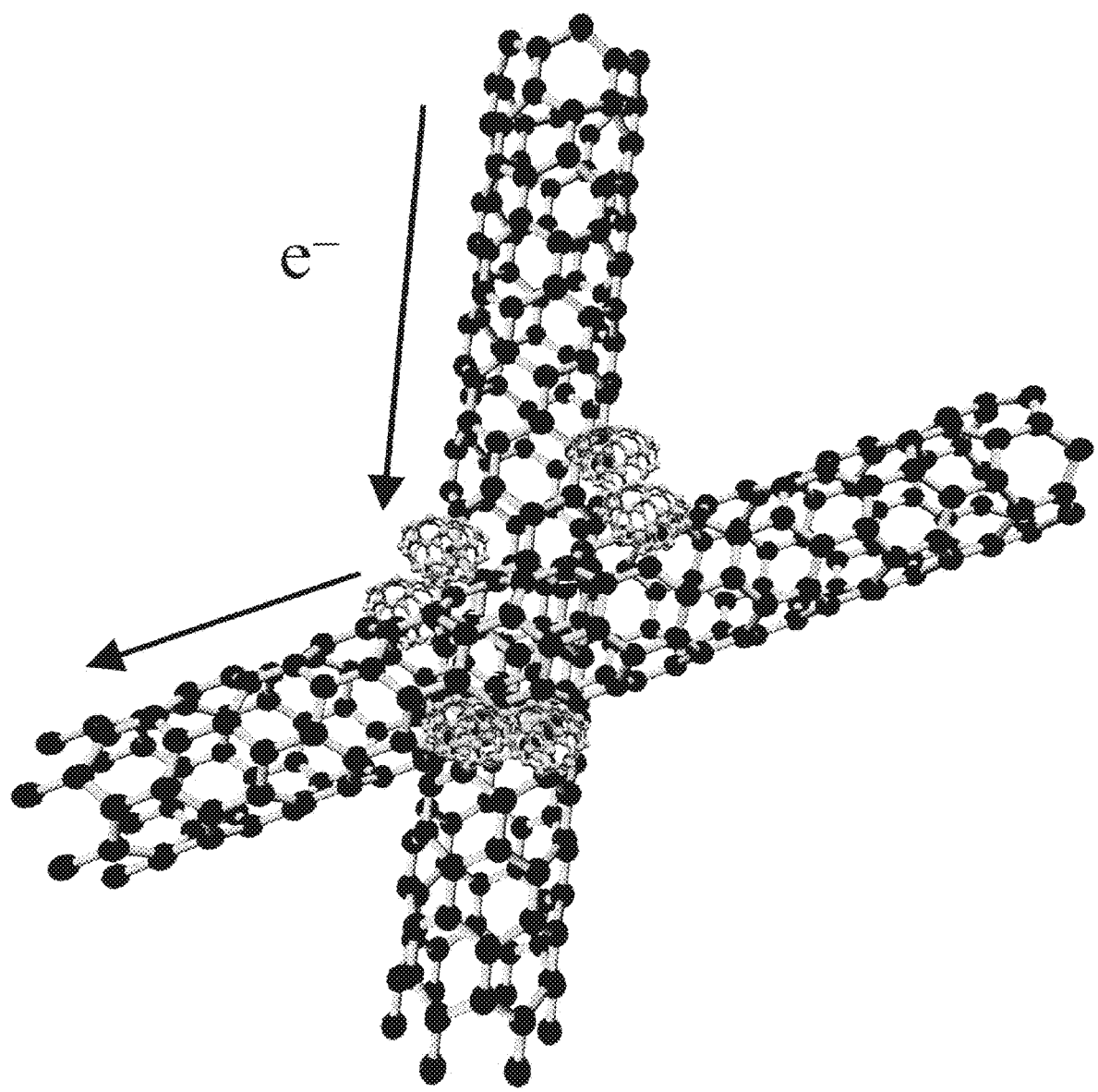
FIG. 15 illustrates an interconnected cross-linked carbon nano-tube network obtained according to the invention.

FIG. 13 illustrates how the carbon nano-tube layer (CNT) on the tapered substrate structure. The growth of CNT following the taper growth mechanism. This will enable the cross-linked CNT network growth as shown in the FIG. 13, as comparing the traditional growth shown in FIG. 14. The 3D distributed catalyst particles will result in a large number of the CNT growth, thus, forming a high density porous CNT film. The CNT growth on the nano-taper array will also enable the "interconnected cross-linked" CNT network as shown in FIG. 15, instead of "overlap cross-linked" CNT, which can lead to a high electron conductivity in the CNT network. The compact interconnected cross-linked CNT network will provide the ion diffusion path, large surface gain, and the high electron conductivity electrode for supercapacitors, thus achieving large energy density for the supercapacitors.

To summarize the present invention relates to a Further, in the embodiment including a porous carbon film the invention relates to an on-chip supercapacitor having an electrode comprising a compact yet porous carbon film (13) on a silicon chip (11), coated with layers of pseudocapacitive electrode materials (15).

In this case the on-chip supercapacitor comprises a silicon substrate and a porous carbon layer positioned thereon, the carbon layer including pseudocapacitive materials. The pseudocapacitive materials are positioned within the pores in said porous carbon layer, and is preferably constituted by constituted by layers in the pore walls, with thickness in the range of 5 nm to 100 nm. Supercapacitor according to claim 1 wherein the pseudocapacitive material is distributed as particles in said carbon layer.

The pseudocapacitive electrode materials may include transition metal oxides (e.g. manganese oxide, nickel oxide, cobalt oxide, etc.) or conductive polymers (e.g. polyaniline, polypyrrole, etc.), or the pores in said porous carbon layer may coated with a layer of MnO$_2$.

As stated above the porous carbon film preferably provides an area in the arrange of of 200-1000 m$^2$ g$^{-1}$, with the typical pore size range of 2-100 nm The layers are provided using a method involving providing a pseudocapacitive electrode materials (5) into the specific compact yet porous carbon film (3) by a chemical bath deposition process, comprising the following steps:
a) Preparation of the plating solution for deposition of the pseudocapacitive electrode materials (5).
b) The specific compact yet porous carbon film (3) is floated on or submerged in the plating solution for 10 minutes to 24 hours, performed with the temperature range of 20° C. to 90° C.

The porous carbon film may be provided as a structure of nanotubes (CNT) on a silicon substrate involving the steps of providing a silicon surface with a surface structure including a nanotapered array. Catalyst metal particles on said nano-tapered silicon surface and the carbon nanotube is grown in a per se known way on said tapered surface from said catalysts.

The invention claimed is:
1. A method for providing a porous carbon film on a silicon substrate, the method comprising:
    depositing catalyst metal nano particles on a nanotapered silicon surface having a surface structure comprising a nanotapered array;
    growing carbon nanotubes (CNTs) on the nanotapered silicon surface from the catalyst metal nano particles to form the porous carbon film; and wherein:
>the nano-tapered array enables interconnected cross-linked CNTs;
>the interconnected cross-linked CNTs form the porous carbon film;
>the interconnected cross-linked CNTs provides an ion diffusion path, large surface gain, and a high electron conductivity between the tapered structures; and
>the porous carbon film has a specific surface area of 200-1000 m2/g, with a pore size range of 2-100 nm.

2. The method according to claim 1, comprising depositing pseudoactive material into the interconnected cross-linked CNTs, forming a pseudoactive material doped porous carbon film.

3. The method according to claim 1, where the pseudoactive material are deposited via a chemical bath deposition process.

4. The method according to claim 1, where the catalyst metal nano particles are nickel nano particles.

* * * * *